Dec. 16, 1924.

L. L. LOCKWOOD

FASTENER

Filed May 12, 1922

1,519,854

Inventor
L. L. Lockwood,

By
Attorney

Patented Dec. 16, 1924.

1,519,854

UNITED STATES PATENT OFFICE.

LEON L. LOCKWOOD, OF CENTERPORT HARBOR, NEW YORK.

FASTENER.

Application filed May 12, 1922. Serial No. 560,297.

*To all whom it may concern:*

Be it known that LEON L. LOCKWOOD, a citizen of the United States of America, residing at Centerport Harbor, in the county of Suffolk and State of New York, has invented new and useful Improvements in Fasteners, of which the following is a specification.

The object of the invention is to provide a simple and efficient device in the form of an attachment or accessory for use in connection with automobiles and like vehicles as a means of holding a robe or blanket in protecting relation with the hood disposed for preventing the cooling of the engine while at rest or between operations thereof in cold weather, and more particularly a readily applicable means whereby the protecting blanket or robe may be held in position against displacement by the wind during the time that the vehicle is parked; and with these objects in view the invention consists in a construction and combination of parts of which a preferred embodiment is shown in the accompanying drawings, wherein:—

Figure 1:
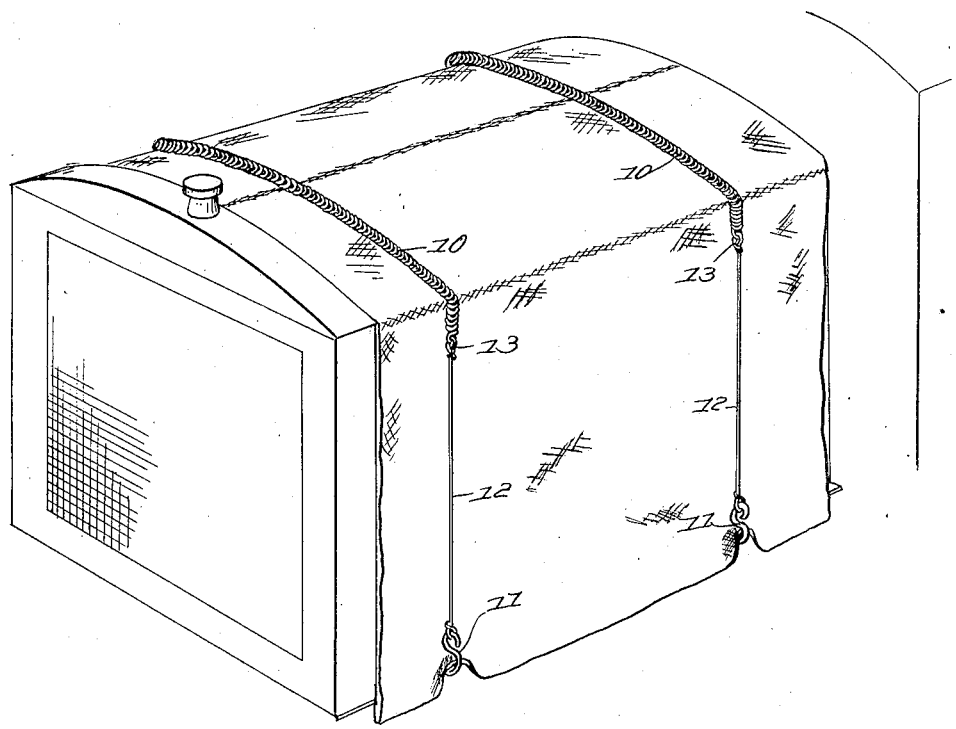
Figure 1 is a view of a fastener embodying the invention applied in the operative position to a vehicle.
Figure 2:
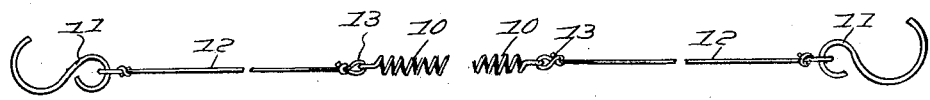
Figure 2 is a detail view of the same.

The device embodying the invention is designed particularly in view of the common use of a robe or blanket to protect and conserve the heat of the motor in the hood of an automobile during the temporary parking thereof, to prevent the displacement of such protecting device by the wind or of its removal surreptitiously without involving a considerable amount of trouble and with the risk of attracting attention, and to this end consists of a spring coil 10 of a length adapted to extend over the hood of the vehicle together with a considerable thickness of robe or blanket which may be arranged thereon and provided with terminal hooks 11 which are preferably connected with the extremities of the coil by means of wire strands 12 which readily bend to adapt themselves to the curvature of the device which is being secured and which have an interlocking eye connection as indicated at 13 with the extremities of the coil to permit of folding into compact form for storage in a convenient place in the vehicle when not in use.

The hooks are of such a construction as to adapt them to be engaged with any convenient portions of the framework of the vehicle beneath or at the sides of the hood under conditions maintaining the coil under a more or less heavy tension, so that the disengagement of the hooks can be accomplished only by the exercise of considerable force and the engaged robe or blanket is tightly clasped around the portion of the hood which is exposed to the wind and serves under the ordinary conditions to expedite the cooling of the motor.

Having described the invention, what is claimed as new and useful is:—

A robe or blanket holding device for the hoods of motor vehicles consisting of a spring coil for disposition in spanning relation to the hood, wire strands having terminal interlocking eye engagement with the spring coil and adapted for disposition at the sides of the hood, and terminal hooks carried at the extremities of said strands for engagement with the elements of a vehicle frame.

In testimony whereof he affixes his signature.

LEON L. LOCKWOOD.